(12) United States Patent
Usui

(10) Patent No.: US 6,629,753 B2
(45) Date of Patent: Oct. 7, 2003

(54) PRINTING SYSTEM AND METHOD

(75) Inventor: Nobuaki Usui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 10/079,547

(22) Filed: Feb. 22, 2002

(65) Prior Publication Data

US 2002/0186275 A1 Dec. 12, 2002

(30) Foreign Application Priority Data

Jun. 11, 2001 (JP) ........................................ 2001-175676

(51) Int. Cl.⁷ ................................................ B41J 2/21
(52) U.S. Cl. ...................................................... 347/43
(58) Field of Search ....................... 347/43, 14; 455/39; 178/23; 370/400, 401

(56) References Cited

U.S. PATENT DOCUMENTS 4,872,157 A * 10/1989 Hemmady et al. .......... 370/401
5,889,956 A * 3/1999 Hauser et al. .............. 709/226

* cited by examiner

Primary Examiner—Thinh Nguyen
(74) Attorney, Agent, or Firm—Staas & Halsey LLP

(57) ABSTRACT

A tele-printing system includes a plurality of printers each for performing printing on a medium based on common electronic printing data at a printing request from a request source; a plurality of color conversion tables, created one for each of the plural printers, each containing printing characteristic information unique to the respective printer; and a management unit for sending said printing data to said plural printers and managing the printing of said printing data on each said printer, in accordance with said unique printing characteristic information. The tele-printing system realizes large item small volume printing at a low cost. It is possible to shorten time required for delivering print mediums to request source and delivery destination from the respective printers. A print specification of each print medium can be modified at a reasonable cost, and the results of printing on plural printer obtain an identical quality in color.

35 Claims, 8 Drawing Sheets

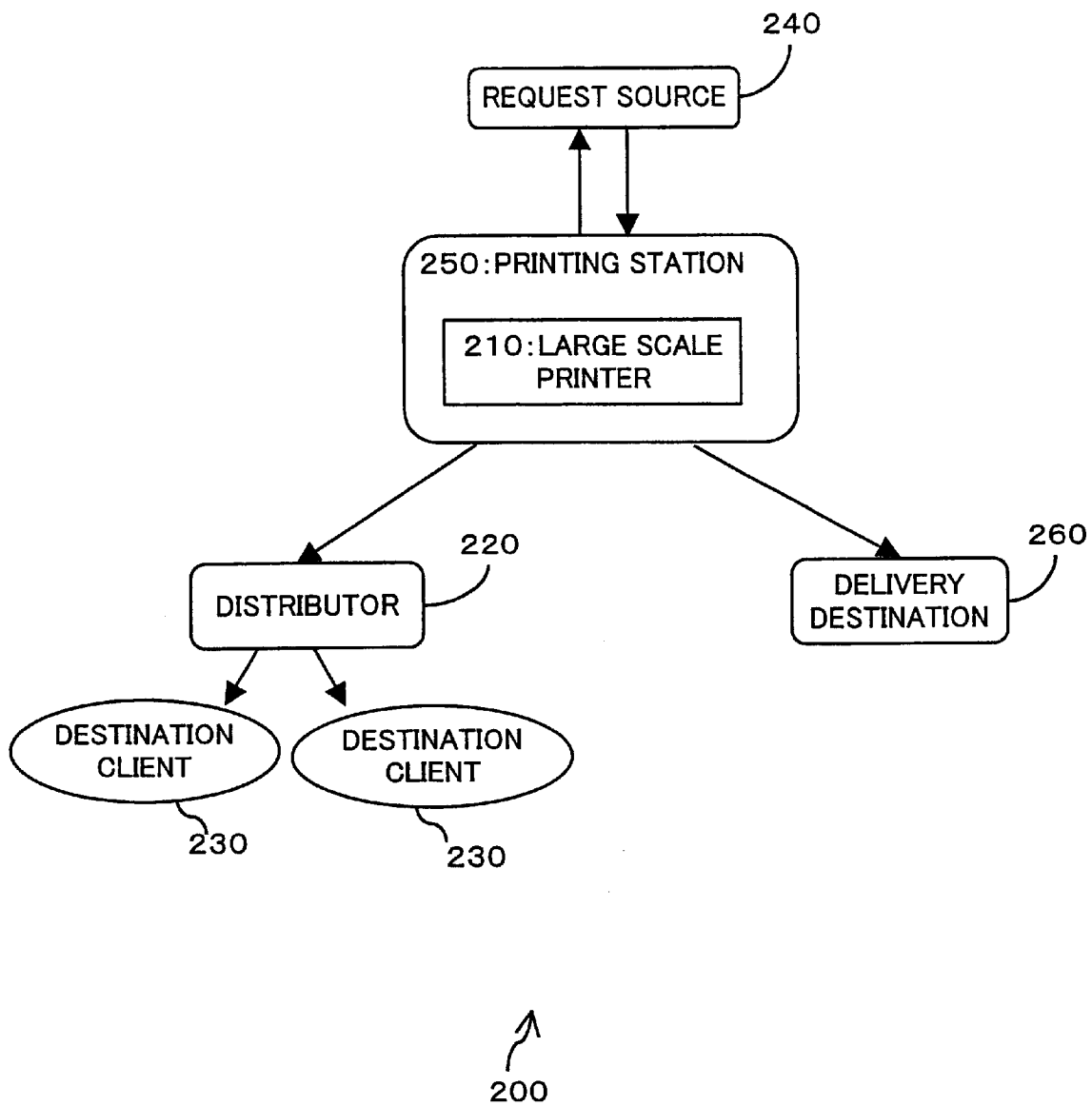

PRINTING SYSTEM AND METHOD

BACKGROUND OF THE INVENTION

1. Field of the Invention

The present invention relates to a printing system including a plurality of printers on which printing of print data, provided by a request source, is carried out, and particularly relates to a printing system and a method in which common electronic printing data is sent to a plurality of middle- or small-printers to perform printing of the common printing data.

2. Description of the Related Art

Even in the surging innovation of the present information technology generation, people wish to take a close look at electronic data, which is printed on a medium such as paper. This results in consumption of 160 million sheets of A4-sized paper in a single year in Japan (as of year of 2001). There is a ten percent growth every year in the number of mediums, on which high-quality graphic art is printed, despite the reduction of its share rate of printed matter.

Furthermore, it is becoming routine for information to be exchanged using electronic data, however, newspaper and other print mediums still play an important role in information circulation in social systems. Newspaper fulfils various requirements that electronic data alone cannot satisfy.

Accompanying drawing FIG. 8 schematically shows a conventional printing system. In conventional printing system 200 in FIG. 8, print mediums, such as newspaper or magazines, are created by printing electronic printing data (data to be printed) and then delivered to delivery destinations, clients or bookstores. Print system 200 comprises a printing station 250, a distributor 220, destination clients 230, a request source 240, and a delivery destination 260.

Request source 240 previously prepared printing data and provided printing station 250 with the printing data to request printing. For example, if the print mediums in question are newspaper, request source 240 corresponds to a newspaper publisher. If such print mediums are magazines, request-source 240 will be a magazine press.

Print station 250 includes a large-scale printer 210, which carries out printing of printing data provided by request source 240. Print station 250 delivers print mediums, as the result of printing, to distributor 220, request source 240, and/or delivery destination 260. Large-scale printer 210 is able to perform high-speed large volume printing, thereby carrying out printing on thousands of mediums per minute.

A plurality of printing stations 250 are installed, one in an individual particular area, however only one printing station 250 appears in FIG. 8.

Distributor 220 delivers print mediums (e.g., newspaper), on which large-scale printer 210 has carried out printing, to destination clients 230. The print mediums are also delivered to delivery destination 260 other than distributor 220 or request source 240. Delivery destination 260 may be a wholesale merchant.

In conventional printing system 200, since large-scale printer 210, installed in printing station 250, carries out printing on a large number of mediums at a time, printing cost per medium is minimized. At the same time, printing station 250 delivers a large number of mediums to a plurality of distributors 220 or delivery destinations 260 at once thereby further reducing transportation costs for a single print medium.

Nevertheless, it is difficult for large-scale printer 210 to perform printing on a small number of mediums due to its high-speed printing performance. Because operation of large-scale printer 210 only for a couple of minutes creates thousands of print mediums, test printing is prohibitively expensive.

Therefore, large-scale printer 210 is preferably not applied to large item small volume printing, and test printing is rarely performed on large-scale printer 210 that actually performs printing of particular printing data on a large number of mediums.

In the meantime, request source 240 may wish to confirm and examine a result of printing of print data (i.e., a print medium on which the print data is printed), prior to the printing of the printing data on a large number of mediums (a large-scale printing). For this purpose, conventional printing system 200 includes color correction equipment (not shown in FIG. 8) which estimates a result of printing of the particular printing data, whereupon request source 240 examines the estimated result.

The color characteristic information of the color correction equipment may however frequently differ from that of large-scale printer 210. Therefore colors in the result of printing carried out on large-scale printer 210 occasionally do not coincide with those of the estimated result, which has been examined by a request source prior to the printing being carried out on large-scale printer 210, whereupon the examination of the estimated result may be ultimately futile.

The delivery of newspaper as a print medium may take an extra long time in accordance with distance between each distributor 220 and printing station 250, where large-scale printer 250 carries out printing. Namely, a length of time required for delivery forces newspaper manuscript deadlines to be set much earlier than the time when the newspaper is delivered to subscribers. Therefore newspaper has a disadvantage in terms of speed of news reporting compared with other media, such as television or radio.

Further, as specific printing data is printed on a large number of mediums at a single printing station 250 at a time, it is almost impossible to modify the particular printing data for each of destination clients 230. Conventional printing system 200 cannot grant a request from an individual destination client 230 even when each of the destination clients 230 wants a print medium without a particular article or a particular advertisement.

When a plurality of retail stores or the like use advertisement sheets identical in contents, such advertisement sheets are printed at printing station 250 and delivered to clients over the areas targeted by the retail stores. Such large-scale printing prevents the contents of the advertisement from being modified or changed to suit each delivery destination, or each of the plural retail stores. For that reason, clients may complain about the advertisement sheets and blame the retail stores when a particular commodity on the advertisement sheet is not sold at some of the plural retail stores (especially, at a retail store at which an individual client intends to purchase the commodity) and when a client assumes that a particular commodity is sold at a store which does not sell the commodity.

Operations carried out on large-scale printer 210 require a skilled engineer thereby boosting labor cost.

In conventional printing system 200, large-scale printers 210, installed in each of print stations 250 in a respective area, carry out printing. However, the color characters unique to each of the plural large-scale printer 210, are not managed by printing system 200. Therefore, when the plural large-scale printers perform printing based on common electronic printing data, the results of printing on respective large-scale printer 210 may not coincide.

SUMMARY OF THE INVENTION

With the foregoing problems in view, it is a first object of the present invention to provide printing system and method suitable for large item small volume printing at a low cost, reducing a length of time required for delivering print mediums to delivery destinations from a place where each printer is installed. It is a second object to provide printing system and method that is operable to provide a print medium that meets a request from an individual client. It is a third object to provide printing system and method for realizing print mediums, on which common electronic printing data is printed by each one of plural printers, identical in colors.

To attain the first through third objects, there is provided a tele-printing system comprising: a plurality of printers each for performing printing on a medium based on common electronic printing data at a printing request from a request source; a plurality of color conversion tables, created one for each of the plural printers, each color conversion table containing printing characteristic information unique to the respective printer; and a management unit, communicably connected to the plural printers through a network, for sending the printing data to the plural printers and managing the printing of the printing data, which is carried out on each the printer, in accordance with the unique printing characteristic information contained in the corresponding color conversion table.

As a preferable feature, the tele-printing system may further comprise a confirmation unit for confirming, prior to the printing of the printing data to be carried out on each of the plural printer, a result of test printing of the printing data, which has been carried out on one of the plural printers, or may a proofing unit for correcting the printing characteristic information of the color conversion tables based on the result of the test printing on the last-named one printer, which result has been confirmed by the confirmation unit. Further, as another preferable feature, the tele-print system may further comprise: a delivery specification determination unit for determining a delivery specification of the print mediums, on which the printing data has been printed by each of the plural printers; and delivery means for delivering the print mediums to delivery destinations based on the determined delivery specification.

As an additional preferable feature, the management unit may manage states of operations of the plural printers and sends the electronic printing data to the individual printers in accordance with the states of operations.

As a further preferable feature, the tele-printing system may further comprise a print specification determination unit for determining a print specification of the printing of the printing data, which is to be carried out on each the printer, in such a manner that each the printer performs the printing of the printing data in accordance with the determined print specification. As still further preferable feature, said management unit may manage the state of delivering of the print mediums, which delivering is performed by the delivery means.

As still further preferable feature, the tele-printing system may further comprise a station that includes the delivery means and at least one of the plural printers, and edits the unique printing characteristic information of the color conversion table corresponding to the last-named one printer. As still further preferable feature, the station may edit the unique printing characteristic information of the color conversion table corresponding to the last-named one printer, or may edit the determined delivery specification corresponding to the print mediums that are to be delivered by the delivery means associated with the station.

As still preferable feature, the tele-printing system may further comprising: a print specification determination unit for determining a print specification of the printing of the printing data, which is to be carried out on each the plural printer; and a station including the delivery means and one of the plural printers, and operable to edit the determined print specification corresponding to the last-named one printer.

As still preferable feature, the tele-printing system may further comprise a station that includes the delivery means and at least one of the plural printers, and edits the determined delivery specification corresponding to the delivery means associated with the station.

As still further preferable feature, the tele-printing system may further comprise a printing fee calculation unit for calculating, prior to the printing of the printing data, an estimated printing fee for the printing of the printing data performed by each the printer, which fee is to be paid by the request source.

As still further preferable feature, the tele-printing system may further comprise a printing progress management unit for managing progress of printing on each the printer; and a printing time estimation unit for estimating, prior to the printing of the printing data by each the printer, a length of time required by each the printer for the printing of the printing data, which is to be carried out at the printing request from the request source, based on the progress of printing.

To accomplish the first through third object of the present invention, as a second generic feature, there is provided a tele-printing method for performing printing of common electronic printing data on a plurality of printers, which are communicably connected to one another through a network, at a printing request from a request source comprising the steps of: (a) creating a plurality of color conversion tables one for each of the plural printers, each color conversion table containing printing characteristic information unique to the respective printer; at the request source where the one printer is installed (b) sending the common electronic printing data to the plural printers; and at each the printer (c) printing on a medium based on the received common electronic printing data in accordance with the unique printing characteristic information contained in the corresponding color conversion table.

As a preferable feature, the tele-printing method may comprise the step of confirming, prior to the printing data printing step (c), a result of test printing of the received common electronic printing data, which has been carried out on the one printer and may further comprise the step of proofing the unique printing characteristic information of the color conversion tables based on the confirmed result of the test printing.

As another preferable feature, the tele-printing method may further comprise the step of managing states of operations of the plural printers, and the sending of the received common electronic printing data being performed in accordance with the last-named states of operations so that the printing of the received common electronic printing data in the printing step (c) is carried out on the plural printers in a distributed way.

As an additional feature, the tele-printing method may further comprise the step of determining a print specification of the printing of the received common electronic printing data in such a manner that the printing of the received common electronic printing data in the printing data printing step (c) is carried out in accordance with the determined print specification, and may further comprise the step of editing the determined print specification at a request from an individual delivery destination of the print medium.

As further additional preferable feature, the tele-printing system may further comprise the steps of: determining a delivery specification of the print mediums; and delivering the print mediums to individual destinations based on the delivery specification.

As a further preferable feature, the tele-printing method may further comprise the step of editing the determined delivery specification at a request from an individual delivery destination of the print medium.

As still further preferable feature, the tele-printing system may comprising the step of managing progress of the delivering of the print mediums in the delivering step, or may further comprise the step of calculating, prior to the printing data printing step (c), an estimated printing fee for the printing of the received common electronic printing data by each the printer, which fee is to be paid by the request source.

As still further preferable feature, the tele-printing system may further comprise the steps of: managing progress of operation of each the printer; and estimating, prior to the printing data printing step (c), a length of time required for the printing of the printing data based on the progress of operation.

As mentioned above, it is possible for the printing system and method of the present invention to guarantee the following advantageous results:

(1) Common electronic printing data is converted based on printing characteristic information, which is unique to each of the plural printers and is contained-in the color conversion tables, whereupon the converted data are sent to each of corresponding printers, which carry out printing of the common electronic printing data in a distribute way. It is possible to meet various requests from the request source and delivery destinations, and to keep the quality of the print mediums constant.

(2) The request source can confirm the result of test printing that has been performed prior to printing of the printing data to be carried out on each of the plural printers. Since the results of printing of the printing data carried out on each of the plural printers are identical with that of the test printing, it is possible to boost the efficiency of printing by eliminating the possibility of re-printing of the printing data and also to improve the service to the request source.

(3) Because the printing characteristic information of the color conversion tables is corrected based on the result of test printing, the request source can obtain a result of printing of the printing data carried out on each of the plural printers as desired.

(4) Since the state of operations of said plural printers is managed and the electronic printing data is sent to the individual printers in accordance with the states of operations to carry out printing thereon, it is possible to work each of the plural printers with high efficiency, and also to reduce time required for printing on a large number of print mediums.

(5) A delivery destination of the print mediums, on which the printing data has been printed by each of the plural printers, and the print mediums, are delivered to delivery destinations based on the delivery specification determined. As a result, it is possible to deliver the print mediums at the request of the request source thereby improving service to the request source. Further, a delivery destination would attain a greater level of satisfaction with delivery based on the determined delivery specification.

(6) The management of the state of delivering of the print mediums improves service to the request source and the delivery destinations because they can grasp the states of delivering of each of the print mediums.

(7) The print specification of the printing of the printing data, which is to be carried out on each of the plural printers, in such a manner that each printer performs the printing of the printing data in accordance with the determined print specification. This improves service to the request source, which would be pleased with the result of the printing because the request source can obtain the print mediums as desired.

(8) Prior to the printing of the printing data carried out on the plural printers, an estimated printing fee that is to be paid by the request source for printing of the print data is calculated. Therefore, it is possible to improve the service to a request source because the request source can obtain an estimated printing fee.

(9) Prior to the printing of the printing data carried out on the plural printers, the request source can establish a length of time required for each of the plural printers for printing of the printing data, which has been estimated based on the progress of printing. This can improve the service to the request source.

Other objects and further features of the present invention will be apparent from the following detailed description when read in conjunction with the accompanying drawings.

BRIEF DESCRIPTION OF THE DRAWINGS

FIG. 8 is a block diagram schematically showing a conventional printing system.

DESCRIPTION OF THE PREFERRED EMBODIMENTS

A preferred embodiment of the present invention will now be described with reference to the accompanying drawings.

Figure 1:
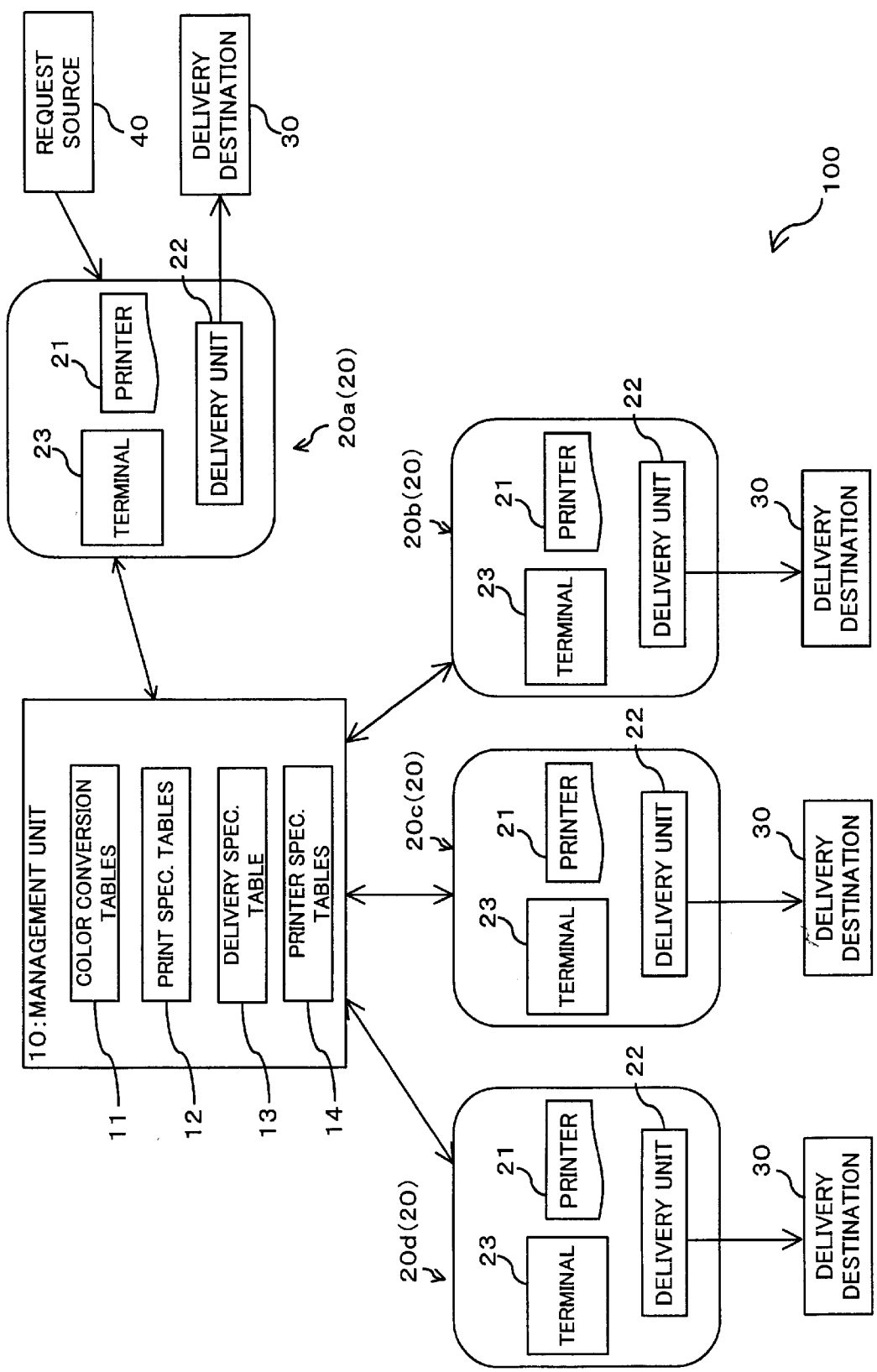
FIG. 1 is a block diagram schematically showing a tele-printing system according to a first embodiment of the present invention.

FIG. 1 schematically shows a tele-printing system 100 according to a first embodiment of the present invention. Tele-printing system 100 performs printing on one or more mediums, such as paper, based on electronic printing data (data to be printed) supplied by a request source 40, and then delivers the print mediums to delivery destinations 30 and/or request source 40. As shown in FIG. 1, tele-printing system 100 comprises a management unit (a printing fee calculating unit, a printing progress management unit, and a printing time estimation unit) 10 and a plurality of stations (a confirmation unit, a proofing unit, a print specification determination unit, a delivery specification determination unit) 20 (20a, 20b, 20c, and 20d).

Four stations in FIG. 1 are respectively allocated reference numbers 20a, 20b, 20c, and 20d, which are used as required to discriminate one particular station from other stations, however a reference number 20 is dedicated to each station to refer to one or more arbitrary station throughout the specification.

Management unit 10 is communicably connected to each station 20 via a communication network (not shown) such as the Internet. Stations 20 may be branch offices or contractors of management unit 10.

Management unit 10 in the form of a server installed on Internet, for example, sends common electronic printing data (hereinafter simply called "printing data" or "electronic printing data") to a plurality of printers 21 through the network and manages printing of the printing data, which is carried out on each printer 21, based on color conversion data (printing characteristic information) contained in each of a plurality of color conversion tables 11 at the request of request source 40. Namely, management unit 10 converts the printing data to data suitable for printing carried out on each printer 21 based on color conversion tables 11 and then sends the plural printers 21 the corresponding converted data for future printing.

Management unit 10 selects one or more printers 21 on which the printing of printing data is carried out among the plural printers 21 based on a printer specification, and a print specification, a delivery specification, which are described later in detail, together with states of operation of the respective plural printers 21 and makes the selected printers 21 carry out printing of the printing data, which has been input from an order-receiving station 20a, based on a later-described print specification or the like.

Management unit 10 comprises color conversion tables 11, print specification tables 12, a delivery specification table 13, and apparatus specification tables 14. Each color conversion table 11 contains color conversion data unique to each printer 21 in such a manner that the results of printing of common electronic printing data on each individual printer 21 become identical in color. One color conversion table 11 is created for each of plural printers 21.

Management unit 10 converts printing data to data suitable for printing carried out on each printer 21 based on the color conversion data registered in color conversion tables 11, each corresponding to each printer 21, and sends stations 20 the corresponding converted data whereupon printers 21, each installed in the stations 20, respectively perform printing of the converted data.

Print specification table 12 contains specification data of printing of printing data, which printing is to be performed on each printer 21. For example, print specification data may be a condition for printing, such as, a particular page or particular data in printing data not printed on a print medium. One print specification table 12 is created for each of the plural printers 21.

Delivery specification table 13 previously registers delivery specification data of print mediums, on which printing data is printed by one of the plural printers 21. For example, delivery specification data, previously set by request source 40, contains the number of print mediums to be delivered, delivery destinations, time of delivery, and a manner of delivery.

Apparatus specification table 14 registers apparatus specification data of an individual printer 21 installed in each station 20. The specification contains a printing speed, printable sizes of paper, and a position of installation of each printer 21. Also apparatus specification tables 14 are created one for each printer 21.

Management unit 10 manages a specification (an apparatus specification) of each printer 21 installed in station 20 based on a printing speed, printable sizes of paper, and a position of installation of each printer 21, which data are contained in apparatus specification tables 14, one created for each of the plural printers 21. Namely, management unit 10 manages the printing capability information of each printer 21.

In tele-printing system 100 of FIG. 1, management unit 10 includes color conversion tables 11, print specification tables 12, delivery specification table 13, and apparatus specification tables 14. Alternatively, these tables may be retained in other non-illustrated devices or in each corresponding station 20 (especially in printer 21 and delivery unit 22), and other alternatives and modifications may be suggested without departing from the gist of the present invention.

Management unit 10 receives information about the progress of printing being carried out on each printer 21 from station 20, in which each printer 21 is installed, to monitor and manage states of operations of the plural printers 21. Management unit 10 serves therefore to function as a printing progress management unit to manage the progress of the printing operation of each printer 21.

When a printing operation is to be performed based on common electronic printing data, first of all, management unit 10 selects one or more printers 21 (stations 20) which carries out the printing operation based on a print specification and a delivery specification of the printing data, and apparatus specifications of the plural printers 21, and states of operations of the plural printers 21. After the selection, management unit 10 sends the printing data to the selected printers 21 to print the printing data.

Management unit 10 manages history information (e.g., the number of pieces of paper that have been printed (hereinafter also called print mediums)) of each of the plural printers 21, each installed in each of the plural stations 20.

When printer 21 continuously prints identical print data on a large number of mediums at a time, the printing on the print mediums starts to vary in color due to a reduction in toners. In order to keep the print mediums identical in color, management unit 10 corrects color conversion table 11 in accordance with the history information of each printer 21 (the number of print mediums) if necessary.

When management unit 10 determines that a print job, which has been requested from request source 40, should be performed by two or more printers 21, management unit 10 checks state of operation and apparatus specification of each printer 21 installed in station 20 and obtains an installation place of each printer 21 and a time at which each printer 21 can start printing. On the basis of the obtained places and times, management unit 10 selects two or more printers 21 and obtains information about size of print mediums on which print data contained in the printing job is printed and colors in the print data with reference to print specification data of the printing job. Management unit 10 further chooses one or more printers 21, which are able to accomplish the printing job (which sufficiently adequate to handle the size of paper and colors in the print data), from the selected printers 21.

In another case, management unit 10 selects one printer 21 that is the nearest to each delivery destination 30 of a print medium based on delivery specification data and apparatus specification data, and makes the selected printer 21 perform printing of the printing data in a distributed way.

When request source 40 requests the printing job to be performed on a small number of print mediums, management unit 10 makes only one printer 21 that is the nearest to a supply source (e.g., request source 40) carry out the printing job. If request source 40 is a supply source of a printing job, management unit 10 selects printer 21 installed in a station 20a shown in FIG. 1 (hereinafter also called order-receiving station 20a) where request source 40 is making a request for the printing job. On the other hand, management unit 10 may determine that a single printer 21 cannot accomplish the printing job due to a large number of print mediums on which the printing data of the printing job is to be printed, and therefore allocates the printing job to one or more printers 21 in stations 20 other than order-receiving station 20a.

When a plurality of printers 21 carries out printing operations based on common electronic printing data, management unit 10 may divide the printing data into two or more parts and allocate each printer 21 to perform printing of each one of the divided printing data parts. Alternatively, management unit 10 may cause each of the plural printers 21 to print the entire printing data.

Management unit 10 may be set an order of priority over printing jobs to be carried out on an individual printer 21 so that each printer 21 executes a printing operation that is given a higher priority.

Further, prior to printing of printing data carried out by one or more printers 21, management unit 10 calculates an estimated printing fee for the printing data by the printers 21, which fee is to be paid by request source 40, based on print specification data, delivery specification data and apparatus specification data of the printing data. Management unit 10 serves to function as a printing fee calculation unit to calculate, prior to printing of printing data, an estimated printing fee for the printing of the printing data by each printer 21, which fee is to be paid by request source 40. Management unit 10 sends the estimated printing fee to the order-receiving station 20a to notify the printing fee to request source 40.

At the same time, prior to printing, management unit 10 also estimates a length of time required by each printer 21 for the printing of printing data, which is to be carried out at the request of request source 40 based on the print specification data, the delivery specification data, apparatus specification data and progress of printing of each printer 21. Namely, management unit 10 also serves to function as a printing time estimation unit to estimate, prior to the printing of printing data by each printer, a length of time required by each printer 21 for the printing of printing data at the printing request from request source 40 on the basis of progress of printing operation of each printer 21 obtained by the printing progress management unit (management unit 10). The estimated length of time required for the printing is notified to request source 40 from management unit 10 via order-receiving station 20a.

A printing fee calculation unit and printing time estimation unit should by no means be limited to being included in management unit 10, and may be included in each station 20.

Each station 20 comprises a printer 21, a delivery unit 22, and a terminal 23. When request source 40 makes a request for printing of printing data, at least one printer 21, out of plural (four in this embodiment) printers 21 in respective stations 20, carries out the printing of the printing data. In general practice, station 20 may be a newspaper distributor, a newspaper printing office or the like.

Request source 40 requests to carry out printing of printing data at a minimum of one station 20 (order-receiving station 20a) among the plural stations 20.

Each printer 21 performs printing on a medium based on electronic printing data received by management unit 10, and is a middle- or small-scale printer suitable for large item small volume printing, of which printing speed is relatively low compared with a large-scale printer. The electronic printing data received from management unit 10 is converted to printing data suitable for printing carried out on each printer 21 based on the color conversion data unique to the respective printers 21.

Printers 21 carry out printing of the converted printing data received from management unit 10 based on a print specification registered in print specification table 12, and may skip to print a particular page or a particular data piece contained in the printing data if the print specification so instructs.

When request source 40 requests to carry out printing of the printing data at order-receiving station 20a, tele-printing system 100 occasionally executes test printing of the printing data, which is carried out on the printer 21 in order-receiving station 20a. After the test printing, request source 40 may confirm or examine the result of the test printing before plural printers 21 carry out printing of the printing data. Namely, order-receiving station 20a that includes one printer 21 also serves as a confirmation unit to confirm, prior to the printing of the printing data to be carried out on plural printers 21, a result of test printing of printing data, which has been carried out on printer 21 in order-receiving station 20a in such a manner that request source 40 can check the result of the test printing.

Each terminal 23 installed in station 20 is in the form of a computer equipped with non-illustrated display and keyboard, and performs various input operations.

Request source 40 and delivery destination 30 input a print specification (contents) of printing data, and edit a print specification that has been registered in print specification table 12 using each terminal 23 at respective stations 20. Therefore each station 20 serves to function as a print specification determination unit to determine specification of printing of printing data.

On the basis of the result of the test printing of printing data, color conversion data is corrected via the keyboard of terminal 23 in such a manner that the printing of the print data carried out on the printer 21 in order-receiving station 20a imparts colors as request source 40 desires. The corrected color conversion data is sent to management unit 10, which corrects color conversion tables 11 which tables has been created one for each of printers 21, and is managed by management unit 10, by reflecting the converted color conversion data. Since request source 40 corrects (proofs, checks) colors to be printed on the printer 21 installed in order-receiving station 20a (station 20) via terminal 23, order-receiving station 20a (stations 20) serves as a proofing unit to correct color conversion data of color conversion tables 11 based on the result of the confirmation of printing by the confirmation unit.

Further, request source 40 and delivery destination 30 input a delivery specification (e.g., delivery destinations, the number of print mediums to be delivered, the time of delivery, manner of delivery) and edits a delivery specification previously registered in delivery specification table 13 via terminal 23 at station 20 (order-receiving station 20a). Namely, each station 20 also serves to function as a delivery specification determination unit to determine a delivery specification of print mediums, on which printing data has been printed by one of printers 21.

Delivery units (delivery means) 22, provided one for each station 20, deliver print mediums to delivery destinations 30 based on a delivery specification registered in delivery specification table 13. Delivery unit 22 corresponds to a newspaper deliveryman, a transportation company or the like. In particular, when a general printing office is station 20, a transportation company or the like corresponds to delivery unit 22.

To delivery destinations 30, printed mediums, on which printing data have been printed by printers 21, are delivered. Each delivery destination 30 corresponds to a newspaper subscriber, a bookstore, a book publisher, a wholesale merchant, or the like. Delivery destination 30 may depend on the kinds of each print medium and contents of each printing data. Request source 40 may also be delivery destination 30.

Here, a succession of procedural steps (Steps A10 to A80 of FIG. 3) performed among management unit 10, station 20, and request source 40 in tele-printing system 100 when request source 40 requests printing of common electronic printing data will now be described with reference to a data flow of FIG. 2.

Figure 2:
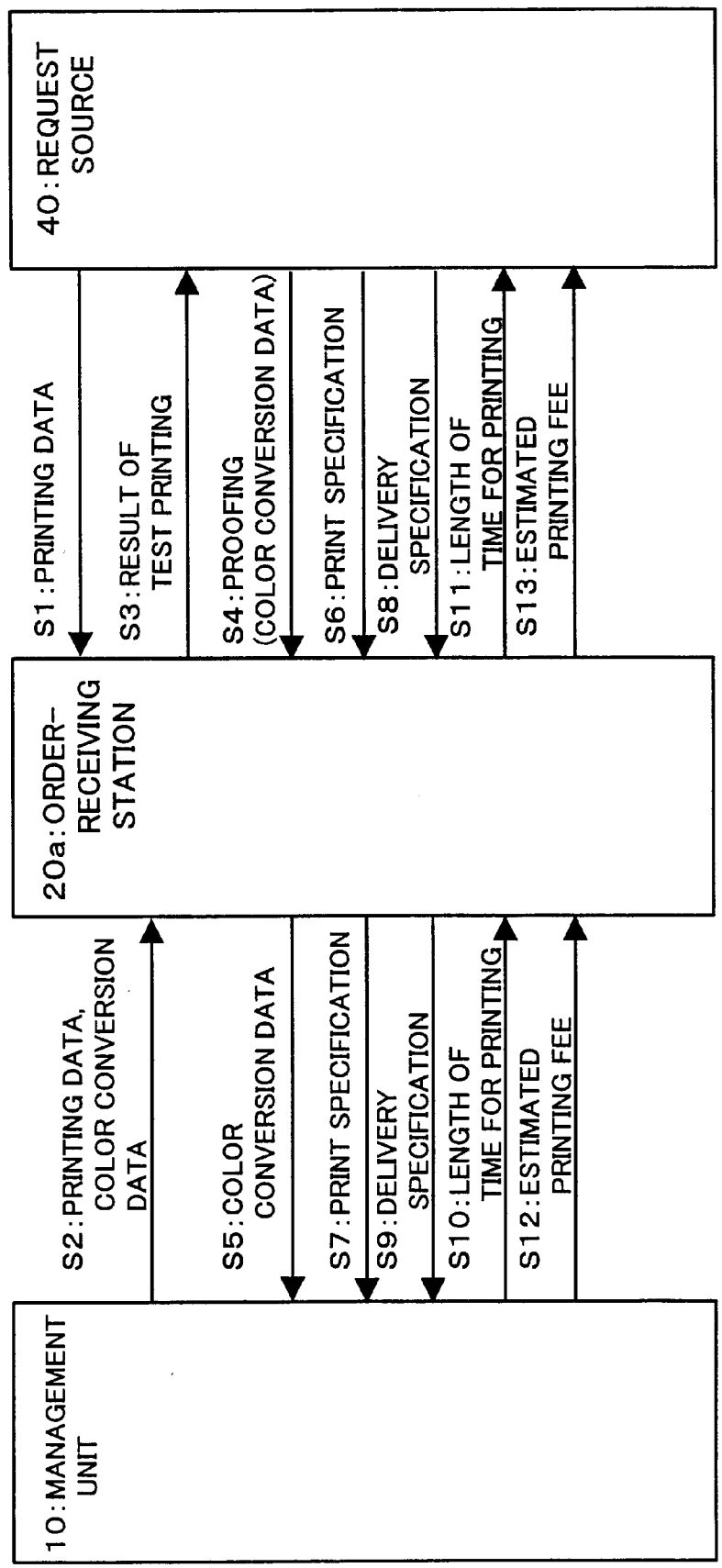
FIG. 2 is a diagram showing a data flow among a management unit, a request-receiving station, and a request source in the tele-printing system of FIG. 1 when the request source requests printing of common electronic printing data.

FIG. 2 shows a data flow among management unit 10, request-receiving station 20a, and request source 40 in tele-printing system 100 when request source 40 requests printing of electronic printing data. In this example, request source 40 makes a request for printing at order-receiving station 20a.

First of all, request source 40 (hereinafter also called a client) provides order-receiving station 20a with electronic printing data (Step A10 in FIG. 3, Arrow Si in FIG. 2). Upon receipt of the printing data at order-receiving station 20a, management unit 10 converts the printing data to data suitable for printer 21 installed in order-receiving station 20a based on color conversion table 11, and returns the converted printing data to order-receiving station 20a (Arrow S2 in FIG. 2). After that, order-receiving station 20a carries out test printing of the converted printing data using the printer 21 therein (Arrow S3 in FIG. 2).

Order-receiving station 20a obtains, from management unit 10, color conversion data retained in color conversion table 11 corresponding to the printer 21 installed order-receiving station 20a (Arrow S2 in FIG. 2).

Request source 40 examines and confirms the result of the test printing and then corrects colors to be printed by the printer 21 with reference to the test printing of the printing data if necessary (Arrow S4 in FIG. 2). The color correction is performed via terminal 23 installed in order-receiving station 20a in such a manner that print mediums, on which the printing data is printed, obtain colors as request source 40 desires. Request source 40 further inputs a print specification and a delivery specification of the printing data via the terminal 23 (Arrows S6 and S8 in FIG. 2).

Figure 3:
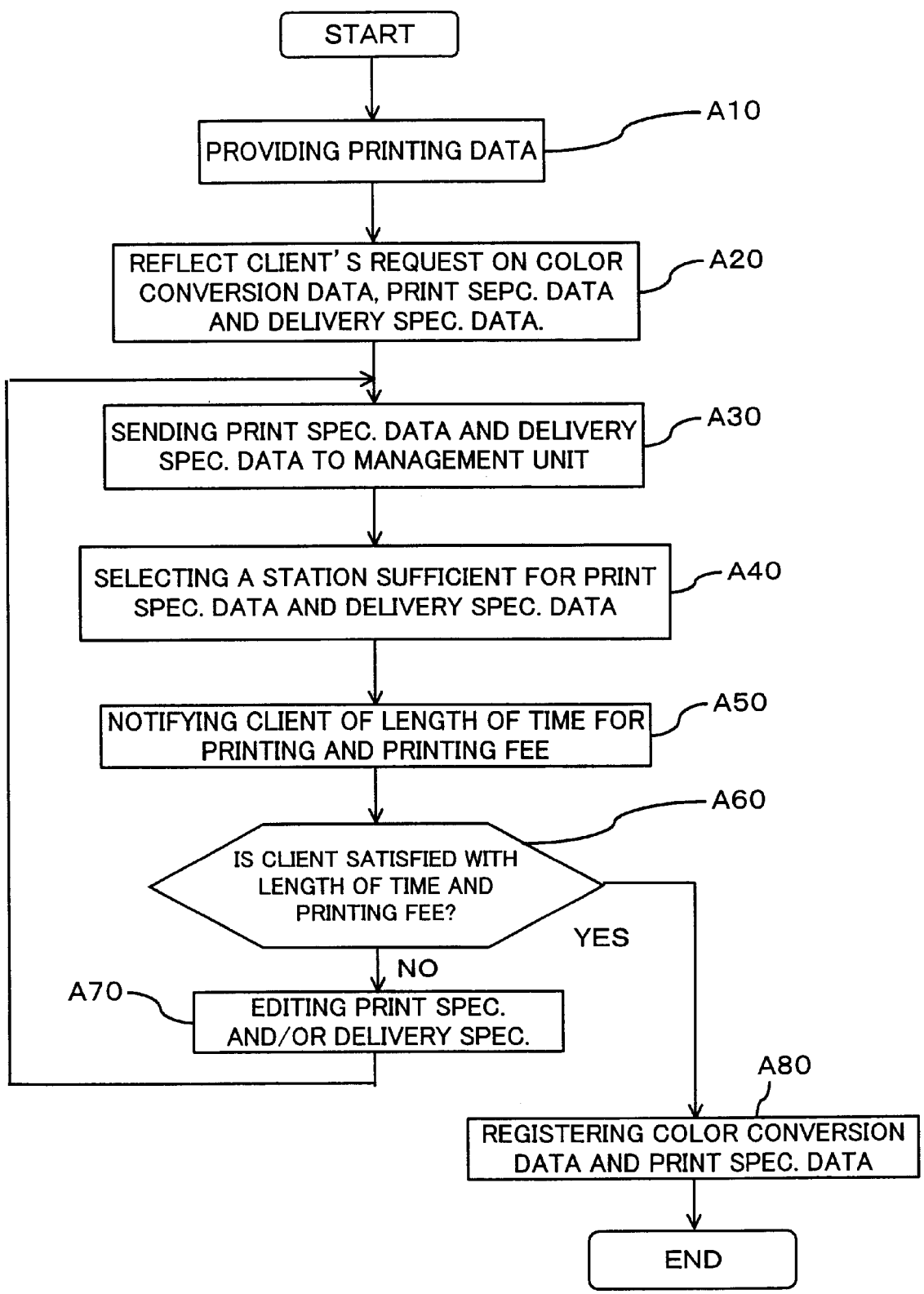
FIG. 3 is a flow diagram illustrating a succession of procedural steps performed by the management unit, the request-receiving station, and the request source in the tele-printing system of FIG. 1 when the request source requests printing of the common electronic printing data.

The terminal 23 reflects the color correction on the color conversion data and the input delivery specification on delivery specification data (Step A20 in FIG. 3) whereupon the terminal 23 (order-receiving station 20a) sends the reflected color conversion data, the reflected delivery specification data and print specification data to management unit 10 (Step A30 in FIG. 3, Arrows S5, S7, and S9 in FIG. 2). Upon receipt of these data pieces, management unit 10 selects one or more stations 20 (Step A40 in FIG. 3), each including printer 21 that is the most suitable for carrying out printing of the printing data, based on the received print specification data and delivery specification data.

Prior to the printing of the printing data, which is carried out by the selected printers, management unit 10 calculates an estimated printing fee for the printing of the printing data, and an estimated length of time required by each of the selected printers 21 for the printing, and notifies order-receiving station 20a of the estimated printing fee and the estimated length of time required for printing (Step A50 in FIG. 3, Arrows S10 and S12 in FIG. 2). Order-receiving station 20a notifies request source (client) 40 of the estimated printing fee and the estimated length of time by displaying them on the monitor of the terminal 23 (Arrows S11 and S13 in FIG. 2).

Request source 40 inputs the result of determination whether or not request source 40 is satisfied with the estimated printing fee and the estimated length of time from the keyboard of terminal 23 in order-receiving station 20a (Step A60 in FIG. 3). When request source 40 is satisfied (Yes route in Step A60 in FIG. 3), order-receiving station 20a registers the reflected color conversion data, the print specification data and the reflected delivery specification data in color conversion table 11, print specification table 12 and delivery specification table 13, respectively (Step A80 in FIG. 3) to complete the procedural steps.

On the other hand, when request source 40 is not satisfied (No route in Step A60 in FIG. 3), request source 40 edits the print specification and the delivery specification via the keyboard or another input device of the terminal 23 (Step A70 in FIG. 3) whereupon the procedural steps return to Step A30.

A succession of procedural steps (Steps B10 to B170) of a printing operation carried out in tele-printing system 100 will be now described with reference to FIGS. 4 through 6.

Figure 4:
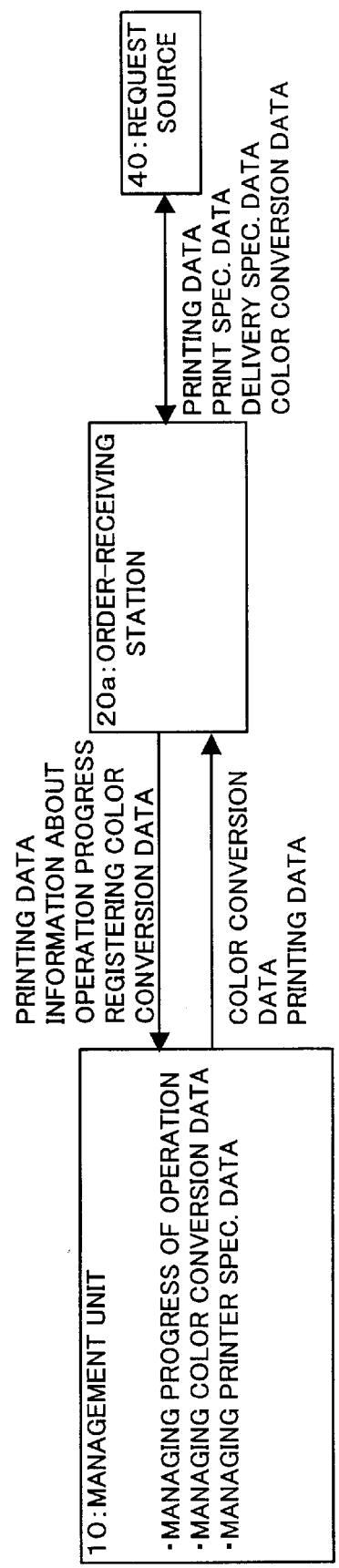
FIG. 4 is a diagram showing a data flow among the management unit, the request receiving station, and the request source in the tele-printing system of FIG. 1 when a printer installed at the order-receiving station prints common electronic printing data.
Figure 5:
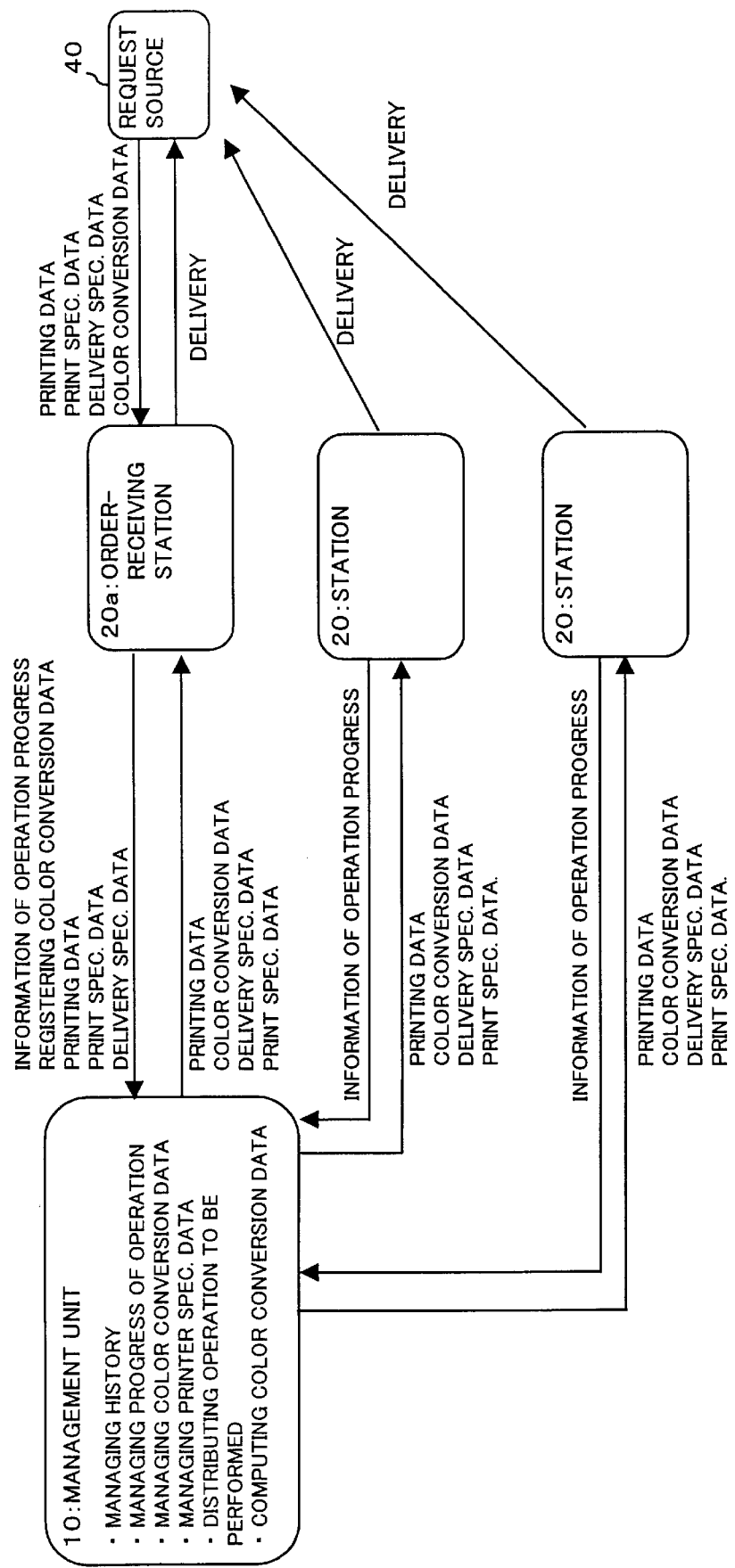
FIG. 5 is a diagram showing a data flow among the management unit, the order-receiving station, the request source, and other stations in the tele-printing system of FIG. 1 when printers installed at the order-receiving station and at stations other than the order-receiving station print the common electronic printing data.
Figure 6:
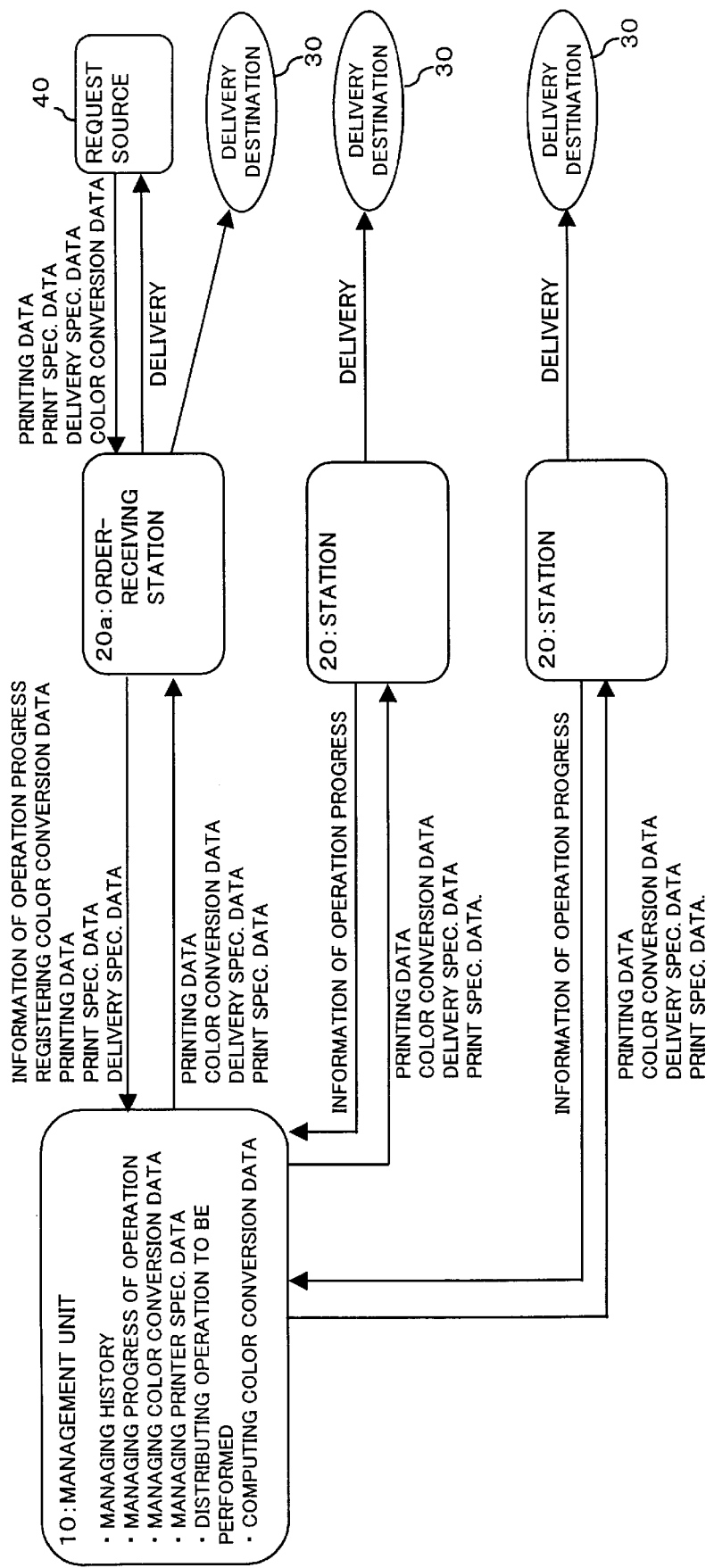
FIG. 6 is a diagram showing a data flow among the management unit, a plurality of stations, and the request source in the tele-printing system of FIG. 1 when print mediums are delivered to respective delivery destinations from the plural stations.
Figure 7:
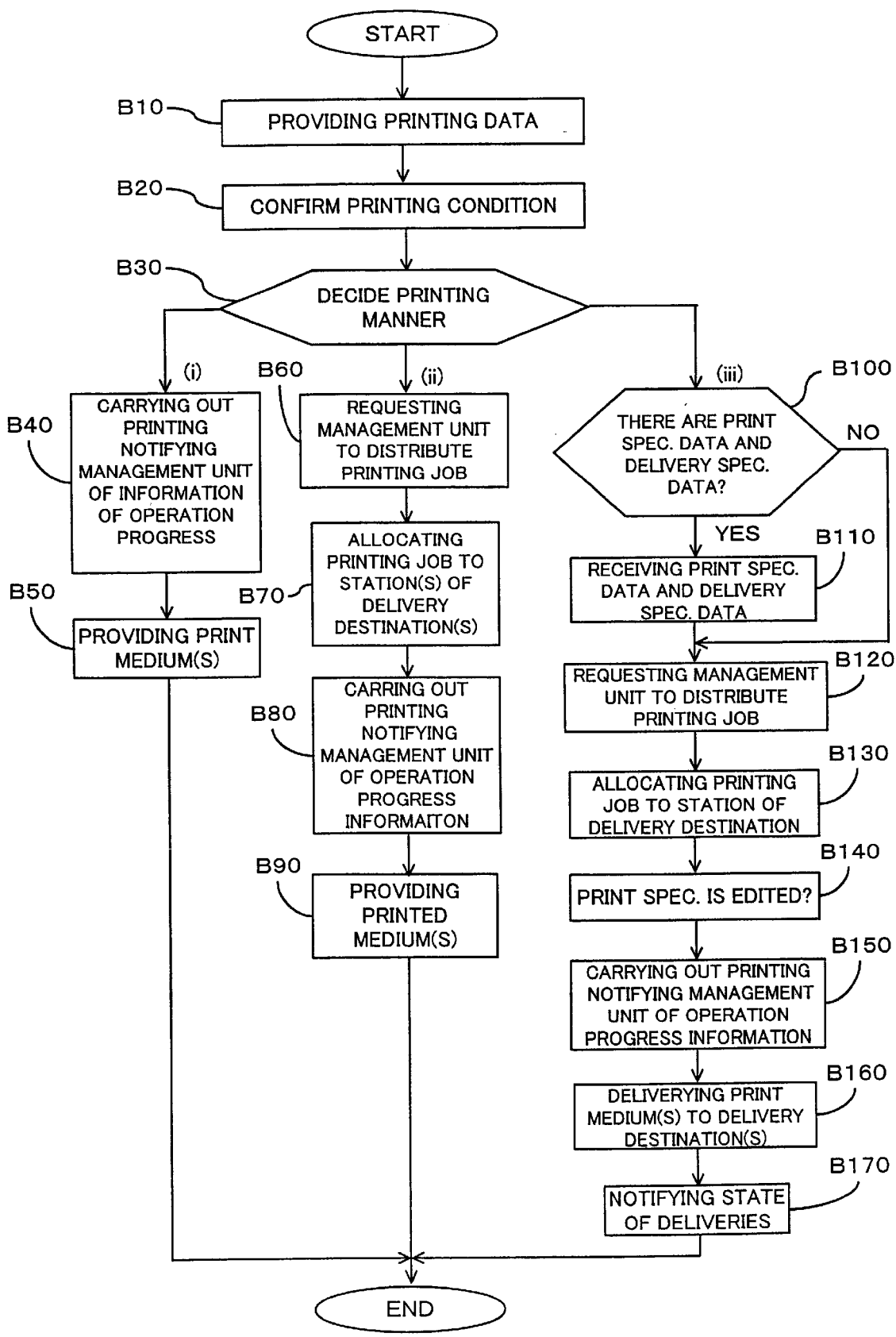
FIG. 7 is a flow diagram illustrating a succession of procedural steps of a printing operation carried out in the tele-printing system of FIG. 1.

FIGS. 4 through 6 respectively show data flows among management unit 10, one or more stations 20, ;and request source 40. Precisely, FIG. 4 shows a data flow among management unit 10, order-receiving station 20a, and request source 40 when printer 21, installed in order-receiving station 20a, carries out printing of printing data; FIG. 5 shows a data flow among management unit 10, stations 20 including order-receiving station 20a, and request source 40 when printers 21 installed in order-receiving station 20a and in stations 20 other than order-receiving station 20a carry out printing of the printing data; and FIG. 6 shows a data flow among management unit 10, one or more stations 20 including order-receiving station 20a, and request source 40 when printed mediums are delivered to delivery destinations 30 from the stations 20.

Request source 40 provides order-receiving station 20a with electronic printing data (Step B10) and order-receiving station 20a sends the printing data to management unit 10, which converts the printing data to data suitable for printer 21 installed in order-receiving station 20a based on color conversion table 11 corresponding to the printer 21 to return the converted printing data to order-receiving station 20a. Upon receipt of the converted printing data, order-receiving station 20a carries out test printing of the converted printing data using the printer 21 therein.

Request source 40 inputs a print specification data and a delivery specification data (regarding the printing data) at order-receiving station 20a as required. The input print specification data and delivery specification data are sent to management unit 10 from order-receiving station 20a. At that time, each station 20 notifies management unit 10 of the state of operation of printer 21 in each of the stations 20.

Before carrying out printing of the printing data on one or more printers 21, management unit 10 calculates an estimated printing fee for the printing of the printing data, and an estimated length of time for each printer 21 required for the printing based on the print specification data, the delivery specification data, and the notified states of operations of printers 21. The estimated printing fee and the estimated length of time are notified to order-receiving station 20a.

Request source 40 confirms the result of the test printing, the estimated printing fee and the estimated length of time at order-receiving station 20a (Step B20).

On the basis of the print specification data, the delivery specification data, and the states of operations of respective printers 21, management unit 10 selects any one of these three options (i) through (iii) (Step B30): (i) printing carried out only on printer 21 in order-receiving station 20a; (ii) collaborative printing carried out on printers 21 installed in order-receiving station 20a and in one or more stations 20 other than order-receiving station 20a; and (iii) printing carried out on a plurality of printers 21 in separate stations 20 and delivering of print mediums from stations 21 where each medium is printed.

When (i) "printing carried out only on printers installed in order-receiving station 20a" is selected (route (i) in Step B30), management unit 10 sends printer 21 in order-receiving station 20a printing data that has been converted to be suitable for the printer 21 based on color conversion table 11, which has been created for the printer 21.

As mentioned above with reference to FIG. 1, request source 40 edits color conversion data, unique to each printer 21 and contained in color conversion tables 11, created one for each of printers 21. Responding to color conversion data, which is unique to the printer 21 installed in order-receiving station 20a and which has been input via terminal 23 therein by request source 40, order-receiving station 20a sends the input color conversion data to management unit 10.

Request source 40 also inputs color conversion data, which request source 40 has previously prepared, from terminal 23 installed in order-receiving station 20a. Order-receiving station 20a sends the input color conversion data to management unit 10, which registers the data in color conversion table 11 corresponding to printer 21 in order-receiving station 20a.

In this case, management unit 10 converts the input color conversion data, which is input by request source 40, to color conversion data suitable for printer 21 installed in order-receiving station 20a.

Upon receipt of the converted color conversion data, the printer 21 in order-receiving station 20a carries out printing of the printing data based on the converted color conversion data (Step B40). After that, print mediums, on which the printing data has been printed by the printer 21, are provided for request source 40 (Step B50).

When (ii) "collaborative printing carried out on printers 21 installed in order-receiving station 20a and in one or more stations 20 other than order-receiving station 20a" is selected ((ii) route in Step B30), request source 40 inputs print specification data and delivery specification data together with electronic printing data to order-receiving station 20a, as shown in FIG. 5. The electronic printing data and print specification data, and the delivery specification data are sent to management unit 10 from order-receiving station 20a. Management unit 10 also receives a state of operation of each of the plural printers 21 from respective stations 20.

Order-receiving station 20a requests management unit 10 to distribute a printing job for the printing data (Step B60). Responding to the request, management unit 10 allocates the printing job, which has been requested by order-receiving station 20a, to select one or more printers 21 in respective stations 20 (Step B70). Management unit 10 converts the printing data to data suitable for each of the selected printers 21, and sends the respective converted printing data to each of the corresponding selected printers 21.

In the illustrated example, the request for distributing of a printing job from order-receiving station 20a causes management unit 10 to allocate the printing job to selected printers 21, however allocating of a printing job should by no means be limited to this example. Alternatively, management unit 10 may allocate the printing job without being requested to do so.

Upon receipt of the printing data, the selected printers 21 at respective stations 20 carry out printing of the printing data on mediums. At the same time, each of the stations 20 notifies management unit 10 of progress of a printing operation of the printing data (Step B80) as required. When each of the stations 20 completes the printing operation, delivery unit 22 of each station 20 delivers print mediums, on which the printing data has been printed by the printers 21 in the same stations of each delivery unit 22, to request source 40 (Step B90).

In the example of FIG. 5, the print mediums, on which the printing data has been printed on each of the selected printers 21, are delivered to request source 40, however delivery destinations of the print mediums should by no means be limited to request source 40 and therefore may be other than request source 40. Further, various alternatives of delivery destination 30 can be suggested without departing the concept of the present invention.

When (iii) "printing carried out on a plurality of printers 21 in separate stations 20 and delivering of print mediums from stations 21 where each medium is printed" is selected (route (iii) in Step B30), request source 40 inputs print specification data and delivery specification data together with electronic printing data to order-receiving station 20a, as shown in FIG. 6. The electronic printing data and print specification data, and the delivery specification data are sent to management unit 10 from order-receiving station 20a.

Order-receiving station 20a determines whether or not request source 40 has input print specification data and delivery specification data (Step B100). When a determination result is negative (No route in Step B100), order-receiving station 20a requests management unit 10 to distribute a printing job (Step B120) based on print specification data and delivery specification data registered in print specification tables 12 and delivery specification table 13.

When a determination result is positive (Yes route in Step B100), order-receiving station 20a obtains printing specification data and delivery specification data from request source 40 (Step B110). After that, order-receiving station 20a sends the obtained printing specification data and delivery specification data to management unit 10 so that management unit 10 registers the printing specification data and delivery specification data in print specification tables 12 and delivery specification table 13 respectively, and the procedural step proceeds to Step B120.

Management unit 10 allocates the print job to plural printers 21 (stations 20) (Step B130) based on the printing specification data and the delivery specification data, which are input by request source 40 or which are previously registered in print specification tables 12 and delivery specification table 13.

Management unit 10 converts the print data for each printer 21 based on color conversion data unique to each of the plural printers 21. Each of the plural stations 20 also edits the print specification data at the request of each delivery destination 30 or the like as required (Step B140).

After that, each of the printers 21 carries out the printing of the printing data on mediums based on the print specification data obtained from print specification table 12 retained in management unit 10 (Step B150). At that time, each of the plural printers 21 notifies management unit 10 of progress of printing operation of the printing data.

At each of the plural stations 20, delivery unit 22 therein delivers the print mediums, on which the printing data has been printed by printer 21 in the same station 20, to delivery destinations 30 (Step B160) based on the delivery specification data registered in delivery specification table 13 of management unit 10. Also at that time, each of the plural stations 21 notifies management unit 10 of the progress of delivery being carried out by the delivery unit 22 therein (Step B170).

As mentioned above, since request source 40 confirms a result of test printing, which is carried out at order-receiving station 20a prior to the printing of the printing data on the plural printers 21, it is possible to boost efficiency of the printing by eliminating the possibility of re-printing of the printing data after the printing on plural printers 21, and to improve the service to request source 40.

Printing of printing data is carried out on middle- or small-scale scale printers 21 suitable for large-item small-volume printing installed at plural stations 20 including order-receiving station 20a. Therefore, since test printing is carried out on printer 21, which is to carry out printing on mediums to be delivered to delivery destinations 30, in order-receiving station 20a with ease, request source 40 can obtain print mediums, on each of which print data has been printed by one of plural printers 21, identical with that confirmed by examining the result of the test printing.

Since operations carried out on middle- or small-scale printers require no skilled engineer, which is required for printing carried out on a large-scale printer, it is possible to reduce printing costs, thereby enhancing the working rate of each printer 21.

Management unit 10 monitors state of operations of each of the plural printers 21 and directs one or more printers 21 (stations 20) among the plural printers 21, on the basis of the monitored states, to carry out printing. As a result, it is possible to work each of the plural printers with high efficiency, and also to reduce length of time required for printing on a large number of print mediums.

A delivery specification of print mediums, on which printing data has been printed by each of the plural printers 21, and the print mediums are delivered to delivery destinations 30 based on the delivery specification so that each of the print mediums is delivered to delivery destination 30, in response to a request from request source 40 or the like.

Management unit 10 monitors states of delivering of print mediums, carried out by delivery units 22 in respective stations 20, whereupon the service to request source 40 and delivery destinations 30 is improved due to being able to grasp the delivering states of each of the print mediums.

As mentioned above, because a print specification is input (corrected or edited) at station 20 (order-receiving station 20a) at the request of request source 40 or delivery destinations 30, request source 40 and delivery destinations 30 can receive printed mediums so as to meet their requirements.

With color conversion tables 11, created one for each of plural printers 21, management unit 10 converts common electronic printing data, which is to be printed on printed mediums, to data suitable for printing carried out on each of the plural printers 21 based on the color conversion data registered in each of color conversion tables 11. Each of the plural printers 21 prints the common electronic printing data based on suitable data, each has been converted for each of the plural printers. As an advantage, when a common electronic printing job (printing of common printing data) is carried out by two or more printers 21, each of the printers 21 can serve printing mediums identical in color thereby keeping the quality of the print mediums, on which each of the plural printers 21 carries out printing, constant.

When request source 40 requests printing of printing data on a small number of mediums, printing carried out on only some of the plural printers 21 realizes low cost printing. Conversely, when a large number of mediums are to be printed, it is possible to complete the printing within a minimum length of time by using most or all of the plural printers 21. In both cases, since color conversion data contained in each of color conversion tables 11 enables print mediums, each on which printing is carried out on different printers 21, to be identical in color, it is possible to meet various requests from clients, and provide print mediums identical in quality.

Since color conversion data contained in each color conversion table 11 is edited or corrected via terminals 23 installed in stations 20 (order-receiving station 20a), it is further possible to provide request source 40 with printed mediums having features (in color) that request source 40 desires.

Management unit 10 monitors state of operation of each printer 21 and directs at least some of printers 21 to print printing data in a distributed way based on the monitored states, and it is possible to efficiently work each of the printers 21 and to reduce time required to print the printing data.

A delivery specification of print mediums, on which printing data has been printed by printers 21, is determined also at stations 20 (order-receiving station 20a), delivering of the print mediums can be carried out on various demands of request source 40 and delivery destinations 30 thereby further satisfying delivery destinations 30.

A print specification is also determined at station 20 (order-receiving station 20a) and therefore the printing of printing data is carried out on each of printers 21 based on the print specification. This improves the service to clients and delivery destinations 30 that would be pleased with the printing medium as the result of the printing.

Prior to printing of printing data, which data has been provided by request source 40, at order-receiving station 20a, management unit 10 calculates an estimated printing fee that is to be paid by request source 40 for printing of the print data, which is to be carried out on one or more selected printers 21 in respective stations. It is possible to improve the service to request source 40 because request source 40 can grasp an estimated printing fee prior to printing of the requested printing data. With reference to an estimated printing fee, request source 40 can edit or change a print specification and a delivery specification. As a result, the service to request source 40 is further enhanced, and request source 40 is satisfied with both the fee and the result of the printing.

Prior to printing of printing data, which request source 40 requested at order-receiving station 20a, management unit 10 further estimates time required for printing of the printing data carried out on each of printers 21 and notifies request source 40 of the estimated length of time thereby improving the service to request source 40. With the estimating of a length of time required for printing on each printer 21, request source 40 can edit or change a print specification and a delivery specification so as to finish the printing within a required length of time. Therefore, it is possible to improve the service to request source 40 and to please request source 40 with the result of the printing performed within an estimated length of time.

A plurality of printers 21, each installed in station 20, carry out printing of common electronic printing data on mediums. It is possible for a newspaper distributor to print mediums of newspaper by employing tele-printing system 100 thereby reducing a length of time required for printing of the common electronic printing data and delivering of the print mediums to delivery destinations 30. As a result, tele-printing system 100 allows a deadline of printing data (such as a newspaper article) to be delayed as compared with a conventional printing system, thereby enhancing the speed of news reporting via a media such as newspaper or the like.

Color conversion tables 11 contain color conversion data, created one for each of the plural printers 21 regarding respective color character unique to each of the plural printers 21 in such a manner that the printing of common electronic printing data, carried out on each printer 21, results in print mediums identical in color. Prior to each printing of common electronic printing data carried out on each printer 21, the common electronic printing data is converted data suitable for each of the plural printers 21 and is provided for each corresponding printer 21. As a result, even if common electronic printing,data is printed on plural printers 21, the printed mediums, on which the common electronic printing data is printed by different printers 21, are identical in color.

Further, the present invention should by no means be limited to this foregoing embodiment, and various changes or modifications may be suggested without departing from the gist of the invention.

In the illustrated example, tele-printing system 100 of FIG. 1 comprises four stations 20a, 20b, 20c and 20d, however the number of stations 20 in tele-printing system 100 should by no means be limited to four. As an alternative, tele-printing system 100 may have less or more than four stations.

Request source 40 makes a request for printing of common electronic printing data at order-receiving station 20a, but this request for printing may be made at station 20 other than order-receiving station 20a.

In this example, management unit 10 includes neither printer 21 nor delivery unit 22, however management unit 10 should by no means be limited to the configuration as shown in FIG. 1. Alternatively, management unit 10 may comprise printer 21 and delivery unit 22 thereby serving to function as one of the plural stations 20.

Further, management unit 10 converts common electronic printing data to data suitable for each of the plural printers 21 based on color conversion tables 11, each of which has been created one for each of the plural printers 21 and contains color conversion data unique to each of the plural printers 21. Such data conversion should by no means be limited to being carried out by management unit 10. As an alternative, each printer 21, each station 20, or another device (not shown) may carry out conversion of common electronic printing data.

What is claimed is:

1. A tele-printing system comprising:
   a plurality of printers each for performing printing on a medium based on common electronic printing data at a printing request from a request source;
   a plurality of color conversion tables, created one for each of the plural printers, each color conversion table containing printing characteristic information unique to the respective printer; and
   a management unit, communicably connected to said plural printers through a network, for sending said printing data to said plural printers and managing the printing of said printing data, which is carried out on each said printer, in accordance with said unique printing characteristic information contained in the corresponding color conversion table.

2. A tele-printing system according to claim 1, further comprising a confirmation unit for confirming, prior to the printing of said printing data to be carried out on each of said plural printer, a result of test printing of said printing data, which has been carried out on one of said plural printers.

3. A tele-printing system according to claim 2, further comprising a proofing unit for correcting said printing characteristic information of said color conversion tables based on said result of the test printing on the last-named one printer, which result has been confirmed by said confirmation unit.

4. A tele-printing system according to claim 3, wherein said management unit manages states of operations of said plural printers and sends said electronic printing data to the individual printers in accordance with the states of operations.

5. A tele-printing system according to claim 2, wherein said management unit manages states of operations of said plural printers and sends said electronic printing data to the individual printers in accordance with the states of operations.

6. A tele-printing system according to claim 1, wherein said management unit manages states of operations of said plural printers and sends said electronic printing data to the individual printers in accordance with the states of operations.

7. A tele-printing system according to claim 1, further comprising a print specification determination unit for determining a print specification of the printing of said printing data, which is to be carried out on each said printer, in such a manner that each said printer performs the printing of said printing data in accordance with the determined print specification.

8. A tele-print system according to claim 1, further comprising:
   a delivery specification determination unit for determining a delivery specification of the print mediums, on which said printing data has been printed by each of said plural printers; and delivery means for delivering the print mediums to delivery destinations based on the determined delivery specification.

9. A tele-printing system according to claim 8, wherein said management unit manages the state of delivering of the print mediums, which delivering is performed by said delivery means.

10. A tele-printing system according to claim 9, further comprising a station that includes said delivery means and at least one of said plural printers, and edits said unique printing characteristic information of said color conversion table corresponding to the last-named one printer.

11. A tele-printing system according to claim 10, further comprising a print specification determination unit for determining a print specification of the printing of said printing data, which is to be carried out on each said printer, said station being operable to edit the determined print specification corresponding to said last-named one printer.

12. A tele-printing system according to claim 11, wherein said station edits the determined delivery specification corresponding to the print mediums that are to be delivered by said delivery means associated with said station.

13. A tele-printing system according to claim 10, wherein said station edits the determined delivery specification corresponding to the print mediums that are to be delivered by said delivery means associated with said station.

14. A tele-printing system according to claim 9, further comprising:

a print specification determination unit for determining a print specification of the printing of said printing data, which is to be carried out on each said printer; and a station including said delivery means and one of said plural printers, and operable to edit the determined print specification corresponding to the last-named one printer.

15. A tele-printing system according to claim 9, further comprising a station that includes said delivery means and at least one of said plural printers, and edits the determined delivery specification corresponding to said delivery means associated with said station.

16. A tele-printing system according to claim 8, further comprising a station that includes said delivery means and at least one of said plural printers, and edits said unique printing characteristic information of said color conversion table corresponding to the last-named one printer.

17. A tele-printing system according to claim 16, further comprising a print specification determination unit for determining a print specification of the printing of said printing data, which is to be carried out on each said printer, said station being operable to edit the determined print specification corresponding to said last-named one printer.

18. A tele-printing system according to claim 17, wherein said station edits the determined delivery specification corresponding to the print mediums that are to be delivered by said delivery means associated with said station.

19. A tele-printing system according to claim 16, wherein said station edits the determined delivery specification corresponding to the print mediums that are to be delivered by said delivery means associated with said station.

20. A tele-printing system according to claim 8, further comprising:

a print specification determination unit for determining a print specification of the printing of said printing data, which is to be carried out on each said plural printer; and a station including said delivery means and one of said plural printers, and operable to edit the determined print specification corresponding to the last-named one printer.

21. A tele-printing system according to claim 8, further comprising a station that includes said delivery means and at least one of said plural printers, and edits the determined delivery specification corresponding to said delivery means associated with said station.

22. A tele-printing system according to claim 1, further comprising a printing fee calculation unit for calculating, prior to the printing of said printing data, an estimated printing fee for the printing of said printing data performed by each said printer, which fee is to be paid by the request source.

23. A tele-printing system according to claim 1, further comprising:

a printing progress management unit for managing progress of printing on each said printer; and a printing time estimation unit for estimating, prior to the printing of said printing data by each said printer, a length of time required by each said printer for the printing of said printing data, which is to be carried out at the printing request from the request source, based on the progress of printing.

24. A tele-printing method for performing printing of common electronic printing data on a plurality of printers, which are communicably connected to one another through a network, at a printing request from a request source, comprising the steps of:

(a) creating a plurality of color conversion tables one for each of the plural printers, each color conversion table containing printing characteristic information unique to the respective printer;

at the request source where said one printer is installed (b) sending said common electronic printing data to said plural printers; and at each said printer (c) printing on a medium based on the received common electronic printing data in accordance with said unique printing characteristic information contained in the corresponding color conversion table.

25. A tele-printing method according to claim 24, further comprising the step of confirming, prior to said printing data printing step (c), a result of test printing of the received common electronic printing data, which has been carried out on said one printer.

26. A tele-printing method according to claim 25, further comprising the step of proofing said unique printing characteristic information of said color conversion tables based on the confirmed result of the test printing.

27. A tele-printing method according to claim 24, further comprising the step of managing states of operations of said plural printers, and said sending of the received common electronic printing data being performed in accordance with the last-named states of operations so that the printing of the received common electronic printing data in said printing step (c) is carried out on said plural printers in a distributed way.

28. A tele-printing method according to claim 24, further comprising the step of determining a print specification of the printing of the received common electronic printing data in such a manner that the printing of the received common electronic printing data in said printing data-printing step (c) is carried out in accordance with the determined print specification.

29. A tele-printing method according to claim 28, further comprising the step of editing the determined print specification at a request from an individual delivery destination of the print medium.

30. A tele-printing method according to claim 24, further comprising the steps of:

determining a delivery specification of the print mediums; and delivering the print mediums to individual destinations based on said delivery specification.

31. A print method according to claim 30, further comprising the step of editing the determined delivery specification at a request from an individual delivery destination of the print medium.

32. A print method according to claim 30, further comprising the step of managing progress of the delivering of the print mediums in said delivering step.

33. A print method according to claim 31, further comprising the step of managing progress of the delivering of the mediums in said delivering step.

34. A print method according to claim 24, further comprising the step of calculating, prior to said printing data printing step (c), an estimated printing fee for the printing of the received common electronic printing data by each said printer, which fee is to be paid by the request source.

35. A print method according to claim 24, further comprising the steps of:

managing progress of operation of each said printer; and estimating, prior to the printing data printing step (c), a length of time required for the printing of the printing data based on the progress of operation.

* * * * *